(12) United States Patent
Loprieno et al.

(10) Patent No.: US 10,938,475 B1
(45) Date of Patent: Mar. 2, 2021

(54) OPTIMIZING CLOCK SYNCHRONIZATION OF OPTICAL NODES CONNECTED BY ASYMMETRIC OPTICAL FIBERS

(71) Applicant: Cisco Technology, Inc., San Jose, CA (US)

(72) Inventors: Gilberto Loprieno, Milan (IT); Carlo Tosetti, Milan (IT)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/718,907

(22) Filed: Dec. 18, 2019

(51) Int. Cl.
| | |
|---|---|
| *H04B 10/00* | (2013.01) |
| *H04B 10/079* | (2013.01) |
| *H04J 14/02* | (2006.01) |
| *H04B 10/2525* | (2013.01) |

(52) U.S. Cl.
CPC ..... *H04B 10/0795* (2013.01); *H04B 10/2525* (2013.01); *H04J 14/02* (2013.01)

(58) Field of Classification Search
CPC ............... H04B 10/0775; H04B 10/40; H04B 10/0795; H04B 10/2513; H04J 3/0661; H04J 3/0667; H04J 3/0697; H04J 3/0658; H04J 3/0673; H04J 3/0644
USPC ......... 398/154, 155, 158, 159, 161, 33, 135, 398/136, 138, 139, 141, 140, 25, 26, 27
See application file for complete search history.

(56) References Cited

U.S. PATENT DOCUMENTS

| | | | | |
|---|---|---|---|---|
| 8,600,239 B2* | 12/2013 | Mani | ................... | H04J 14/0272 398/154 |
| 9,584,217 B2* | 2/2017 | Bottari | .................. | H04J 3/0661 |

FOREIGN PATENT DOCUMENTS

CN 103840877 B 6/2014

OTHER PUBLICATIONS

IEEE, "IEEE Standards Interpretations for IEEE Std 1588™-2008 IEEE Standard for a Precision Clock Synchronization Protocol for Networked Measurement and Control Systems", IEEE Standards Association, 2011, New York, New York, 29 pages.
Corning, "Corning SMF-28 Ultra Optical Fiber", Corning Incorporated, Nov. 2014, 2 pages.
IEEE, "IEEE 1588v2 PTP Support", Cisco ASR 1000 Series Aggregation Services Routers Software Configuration Guide, „Jan. 16, 2017, 24 pages.

* cited by examiner

*Primary Examiner* — Hanh Phan
(74) *Attorney, Agent, or Firm* — Edell, Shapiro & Finnan, LLC

(57) ABSTRACT

A method of measuring lengths of optical fibers on forward and return paths is provided in order to synchronize clocks of optical nodes connected by asymmetrical optical fiber paths. The method includes calculating, by a first optical network device, a first propagation delay of a first optical signal transmitted at a first wavelength on a first optical fiber to the first optical network device from a second optical network device and a second propagation delay of a second optical signal transmitted at a second wavelength on the first optical fiber to the first optical network device from the second optical network device. The second wavelength is different from the first wavelength. The method further includes determining, by the first optical network device, a first length of the first optical fiber based on the first propagation delay and the second propagation delay.

20 Claims, 7 Drawing Sheets

OPTIMIZING CLOCK SYNCHRONIZATION OF OPTICAL NODES CONNECTED BY ASYMMETRIC OPTICAL FIBERS

TECHNICAL FIELD

The present disclosure relates to optical networks.

BACKGROUND

Optical networks are commonly employed to transmit data. Wavelength-division multiplexing (WDM) and dense wavelength-divisional multiplexing (DWDM) techniques may be employed to transmit data in optical signals at different wavelengths over a common or shared optical fiber, sometimes referred to as an optical link. In these techniques, clocks at the respective network elements, nodes, and/or devices are synchronized and Time of Day (TOD) information is distributed.

One protocol used to synchronize clocks of network elements is the Precision Time Protocol (PTP) defined by Institute of Electrical and Electronics Engineers (IEEE) standard 1588v2. The IEEE 1588v2 standard defines synchronization and distribution of Time Of Day from a master clock of a master node to one or more slave clocks of slave nodes, remote slave clients, or another master node. In the PTP, the clocks are synchronized throughout a packet-switched network. The synchronization is achieved using packets that are transmitted and received in a session between the master clock and the slave clock. Messages are received after "some time" because of a delay in propagation of signals through the physical medium (optical fibers). For example, one hundred kilometer of an optical fiber introduces 500 microseconds (μs) of propagation delay (5 μs for a kilometer). This propagation delay is an error that is to be calculated and compensated for when synchronizing clocks. The PTP calculates the round trip delay between the master clock and the slave clock. The delay or latency between the master node and slave node(s) is assumed to be half of a round trip latency delay. Accordingly, the PTP calculations assume that the optical fiber of a forward path and the optical fiber of a reverse path are symmetrical. The PTP calculations introduce additional error when the optical fibers are asymmetrical.

DESCRIPTION OF EXAMPLE EMBODIMENTS

Overview

Figure 1:
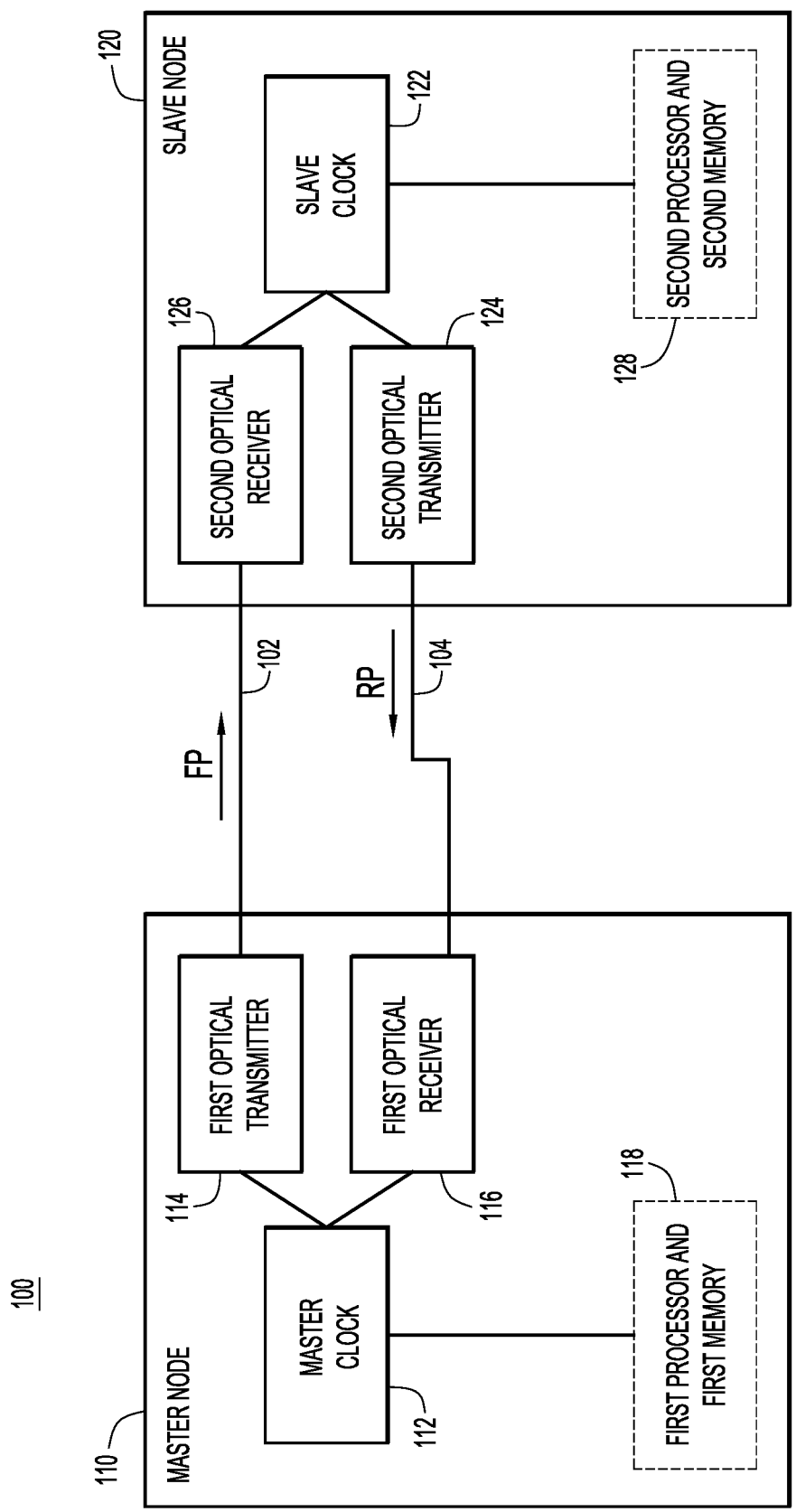
FIG. 1 is a block diagram illustrating an optical network including first and second optical nodes configured to adjust for asymmetrical optical links connected between them, according to an example embodiment.

Briefly, in one embodiment, methods are presented for measuring lengths of optical fibers on forward and return paths in order to synchronize clocks of optical nodes connected to each other by asymmetrical paths. In these methods, a first optical network device calculates a first propagation delay of a first optical signal transmitted at a first wavelength on a first optical fiber to the first optical network device from a second optical network device. The first optical network device further calculates a second propagation delay of a second optical signal transmitted at a second wavelength on the first optical fiber to the first optical network device from the second optical network device. The second wavelength is different from the first wavelength. The first optical network device determines a first length of the first optical fiber based on the first propagation delay and the second propagation delay.

Example Embodiments

New technologies, such as a fifth generation (5G) mobile network, use accurate synchronization of distal clocks of nodes in the network. For example, 5G networks rely on clock accuracy of less than a 10 nanosecond deviation. This leaves little room for error in synchronizing TOD of distal clocks.

Example embodiments present a technique that combines the round trip delay calculation supported by the PTP of IEEE 1588v2 with physical characteristics of an optical fiber to reduce errors in synchronization of clocks of optical nodes that are in communication with each other. In particular, the technique employs different propagation delays of an optical signal on an optical fiber at different wavelengths to estimate the length of the optical fiber. An asymmetry between a first optical fiber of a forward path and a second optical path of a reverse path between first and second optical nodes can be determined. Based on the estimated length of the respective forward path and reverse path optical fibers, actual propagation delay may be estimated and applied to synchronize the clocks at the first and second optical nodes. That is, based on the estimated length, the propagation delay may be obtained and used to adjust the TOD of the clock of one of the first and second optical nodes. In another example embodiment, the offset in the round trip delay obtained using the PTP technique may be adjusted proportional to the asymmetry of the optical fibers on the forward and reverse paths, instead of using as the offset one half the round trip delay obtained using the PTP technique.

The techniques presented herein do not use any additional hardware components or devices for measuring the length of the optical fibers. In example embodiments, during an initialization phase, multiple wavelengths are selected and the round trip delay is calculated at the selected multiple wavelengths using the PTP technique. Differences between the round trip delays at different wavelengths with respect to a single optical fiber is then associated with a length of that optical fiber. Accordingly, errors that may result from the asymmetry of the optical fibers are reduced and/or eliminated by using the calculated length of the optical fiber to account for the propagation delay when synchronizing clocks of the first and second optical nodes, as described in more detail below.

FIG. 1 is a block diagram illustrating an optical network 100 in which clocks at respective optical nodes connected via asymmetrical optical fibers are synchronized, according to an example embodiment.

The optical network 100 may employ WDM or DWDM technologies. In FIG. 1, the optical network 100 includes a forward path (FP) optical fiber 102 and a reverse path (RP) optical fiber 104 connected between a master node 110 and a slave node 120. The optical network 100 may include multiple nodes and the number of nodes depends on a particular configuration of the optical network 100 and is not limited to the example depicted in FIG. 1.

The FP optical fiber 102 and the RP optical fiber 104 provide bidirectional communication for the master node 110 and the slave node 120. The FP optical fiber 102 supports optical communication channels of different wavelengths ($\lambda$'s) or frequencies from the master node 110 to the slave node 120. The RP optical fiber 104 also supports optical communication channels of different wavelengths ($\lambda$'s) but from the slave node 120 to the master node 110. The FP optical fiber 102 may span the same wavelengths as the RP optical fiber 104 but may have a different length that that of the RP optical fiber 104, as shown in FIG. 1. Since the FP optical fiber 102 and the RP optical fiber 104 may have different lengths, and thus the FP optical fiber 102 and the RP optical fiber 104 may be considered asymmetrical.

An example of an optical fiber may be a Single Mode Optical Fiber such as Corning SMF-28 fiber specified by the ITU-TG.652, TIA/EIA-492CAAA, IEC Publication 60793-2, GR-20-Core requirements. The SMF-28 fiber is optimized for low cost transmission at the 1310 nm wavelength region and can be used effectively with Time Division Multiplexing (TDM) and WDM systems operating in the 1559 nm wavelength region. Physical characteristics of the SMF-28 fiber may include a zero dispersion wavelength $\lambda 0$, such that $1302 \text{ nm} \leq \lambda 0 \leq 1322 \text{ nm}$ and a zero dispersion slope $S_0 \leq 0.092 \text{ ps/(nm}^2\text{*km)}$.

The master node 110 and the slave node 120 are optical network elements or devices (nodes), such as transponders that are connected to one another via the FP optical fiber 102 and the RP optical fiber 104. The master node 110 includes a master clock 112, a first optical transmitter 114, a first optical receiver 116, a first processor and a first memory 118. The slave node 120 includes a slave clock 122, a second optical transmitter 124, a second optical receiver 126, and a second processor and a second memory 128. The optical transmitters 114 and 124, each includes a transmit module and a transmitter digital signal processor (DSP), not shown. The optical receivers 116 and 126 each includes a receiver module and a receiver DSP, not shown. The transmit module and the receive module may be optical pluggable modules configured to transmit and receive optical signals, respectively. The DSPs process the electrical signals by performing various signal processing operations including changing transmission parameters. The processors/memories 118 and 128 control the components of its respective optical network element. In an example embodiment, the master clock 112 and the slave clock 122 are synchronized to have the same TOD, using the techniques presented herein.

Figure 2:
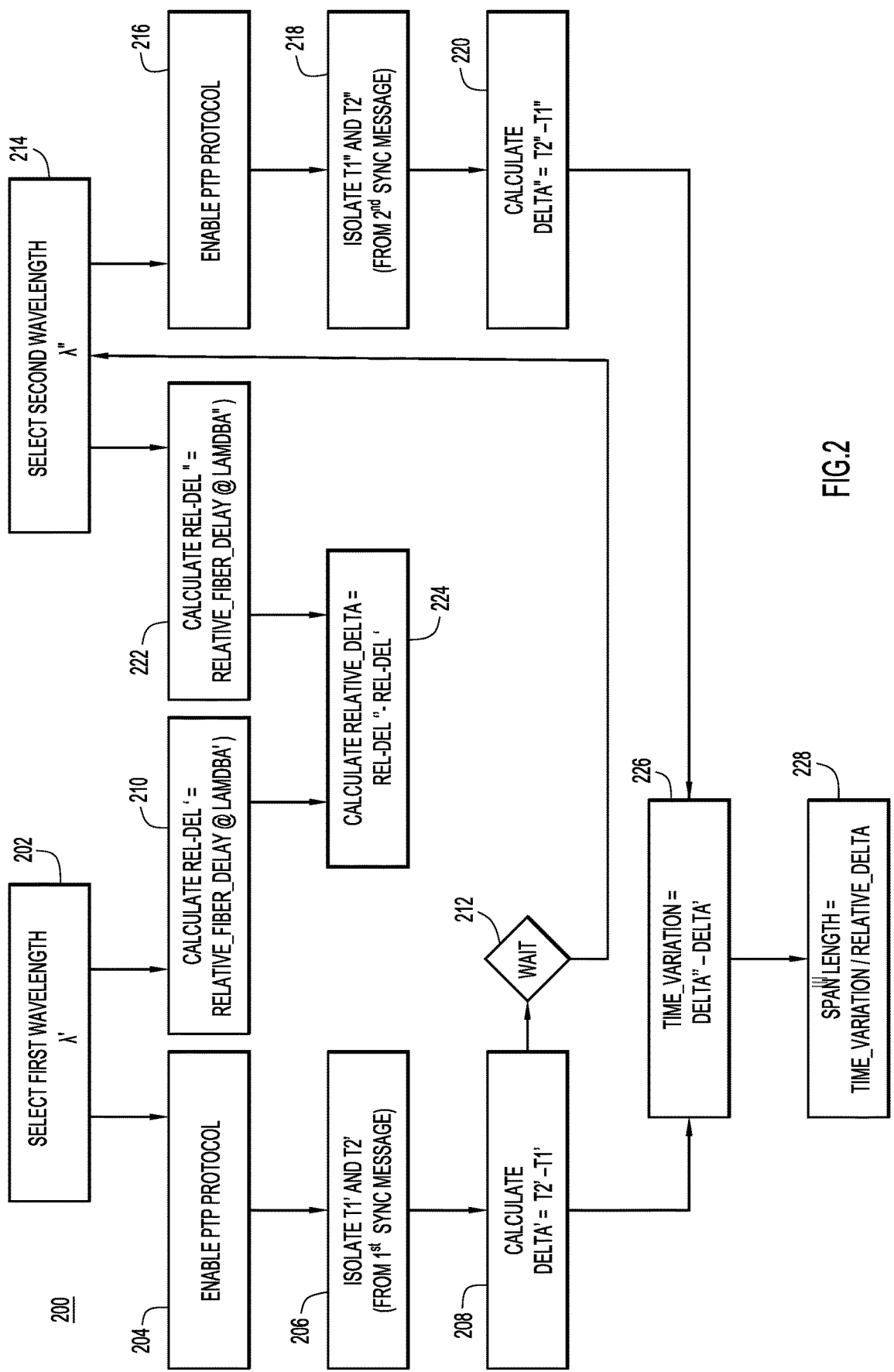
FIG. 2 is a flowchart illustrating a method of determining a length of an optical fiber for purposes of determining asymmetrical optical links, according to an example embodiment.

FIG. 2 is a flowchart illustrating a method 200 of measuring a length of an optical fiber, according to an example embodiment. The method 200 may be performed at each optical network element (such as the master node 110 or the slave node 120) that is to synchronize its clock to the clock of another optical network element or device. In FIG. 2, the length of a single optical fiber is measured e.g., the FP optical fiber 102 shown in FIG. 1, using the method 200 shown in FIG. 2. To measure the length of the other optical fiber e.g., the RP optical fiber 104 shown in FIG. 1, the optical network element performs the method 200 using values obtained from propagating optical signals on the RP optical fiber 104. In an example embodiment, the slave node 120 may execute the method 200 to synchronize the slave clock 122 with the master clock 112 of the master node 110.

At 202, the slave node 120 selects a first wavelength $\lambda'$. The slave node 120 may select the first wavelength $\lambda'$ by way of software executed on the slave node 120 or set as a default value based on user input and/or available wavelengths.

At 204, the slave node 120 enables the PTP protocol to transmit synchronization (sync) messages and receive acknowledgement messages to calculate the round trip delay in accordance with IEEE 1588v2. This operation is explained in further detail below with reference to FIG. 3.

Figure 3:
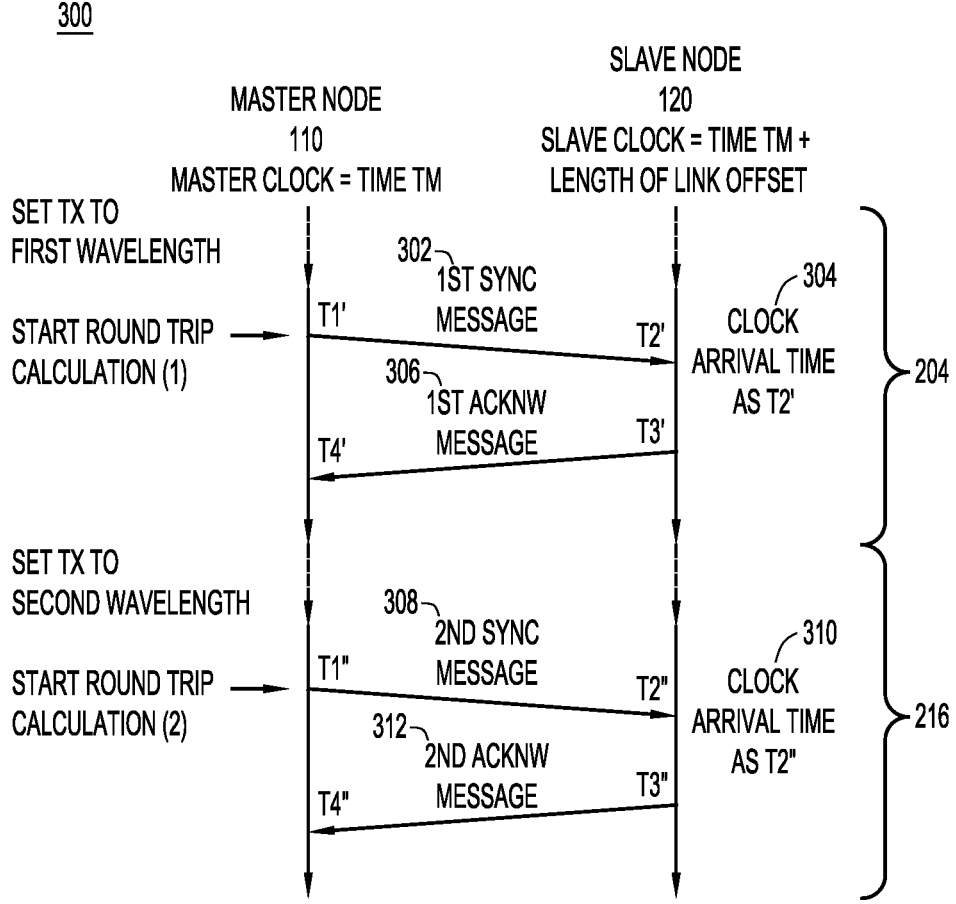
FIG. 3 is a diagram illustrating a method of obtaining propagation delays of optical signals transmitted, at different wavelengths, through a first optical fiber of a forward path and obtaining propagation delays of optical signals transmitted, at different wavelengths, through a second optical fiber of a reverse path, according to an example embodiment.

FIG. 3 is a diagram illustrating a method 300 of obtaining propagation delays of optical signals transmitted, at different wavelengths, through the FP optical fiber 102 and obtaining propagation delays of optical signals transmitted, at different wavelengths, through the RP optical fiber 104, according to an example embodiment. The method 300 is performed by an optical network element (such as the master node 110 or the slave node 120).

The method 300 includes at 302, transmitting a first sync message on the FP optical fiber 102 from the master node 110 to the slave node 120. The first sync message includes a first timestamp of T1' indicating the time at which the message was sent. At 304, the slave node 120 generates a second timestamp T2' indicating an arrival time of the first sync message at the slave node 120. FIG. 3 also shows, at 306, the slave node 120 sending a first acknowledgement message to the master node 110. The first acknowledgement message is sent at T3' and arrives at the master node 110 at T4'.

Referring back to FIG. 2, at 206, the slave node 120 isolates (obtains) the first timestamp T1' from the first sync message and obtains the second timestamp T2'. At 208, the slave node 120 calculates the flight delay time or propagation delay (Delta'=T2'-T1'). Due to different speed propagation of light over the FP optical fiber 102, Delta'=T2'-T1' is proportional to the length of the FP optical fiber 102.

At 210, the slave node 120 calculates a relative delay (Rel-Del') of the FP optical fiber 102 at the first wavelength $\lambda 1$ using the following equation:

$$\text{Fiber\_delay} = ((\text{slope}/8)*\lambda'^2*(1+(\text{lambda\_zero}^4/\lambda'^4))) - (\text{slope}/4)*\text{lambda\_zero}^2$$

In the above equation, lambda_zero and slope are known physical characteristics of the FP optical fiber 102. Lambda_zero is a dispersion compensation parameter of the FP optical fiber 102. Since the speed of light within the FP optical fiber 102 is not constant, the equation returns a relative delay of the FP optical fiber 102 in ps/km for a given lambda_zero (nm), the slope (ps/nm^2 km), and the first wavelength $\lambda'$.

In one embodiment, physical characteristics of the FP optical fiber 102 may be unknown. In this case, default values are used and the resulting measurement may include a small error. The slave node 120 may perform the operation 210 at any time since this calculation is not based on any measurement. For example, operation 210 may be performed at substantially the same time as operations 204-208.

At 212, the slave node 120 waits for the results of similar calculations performed for a second wavelength λ". Specifically, at 214, the slave node 120 selects a second wavelength λ". If the first wavelength λ' is set to a low value, the second wavelength λ" may be set to a higher value. The greater the difference between the first and second wavelengths, the better the resolution of the measurements. More accurate calculations may be obtained with a wider disparity between the first and second wavelengths.

Operations 216, 218, 200 and 222 are analogous to the operations 204, 206, 208 and 210, respectively, but are performed with respect to the second wavelength λ". With the exception of operation 216, detailed explanations are omitted for the sake of brevity. Operation 216 is shown in more detail in FIG. 3. Specifically, at 308, the second sync message is transmitted from the master node 110 to the slave node 120. This second sync message is transmitted at the second wavelength λ" and includes a third timestamp T1". The third timestamp T1" indicates the time of sending the message. At 310, the slave node 120 clocks the arrival of the second sync message, indicated as a fourth timestamp T2". FIG. 3 also shows, at 312, the slave node 120 sending a second acknowledgement message to the master node 110. The second acknowledgement message is sent at T3" and arrives at the master node 110 at T4".

Returning back to FIG. 2, at operation 220, Delta" is computed based on the difference between T2" and T1", depicted in FIG. 3. At 222, the slave node 120 calculates the relative delay Rel-Del" based on the relative fiber delay at the second wavelength λ", similar to that described above in connection with operation 210. At 224, the slave node 120 calculates the difference (relative delta) between two relative delays calculated at 210 and at 222, as Rel-Del"-Rel-Del'.

Figure 4:
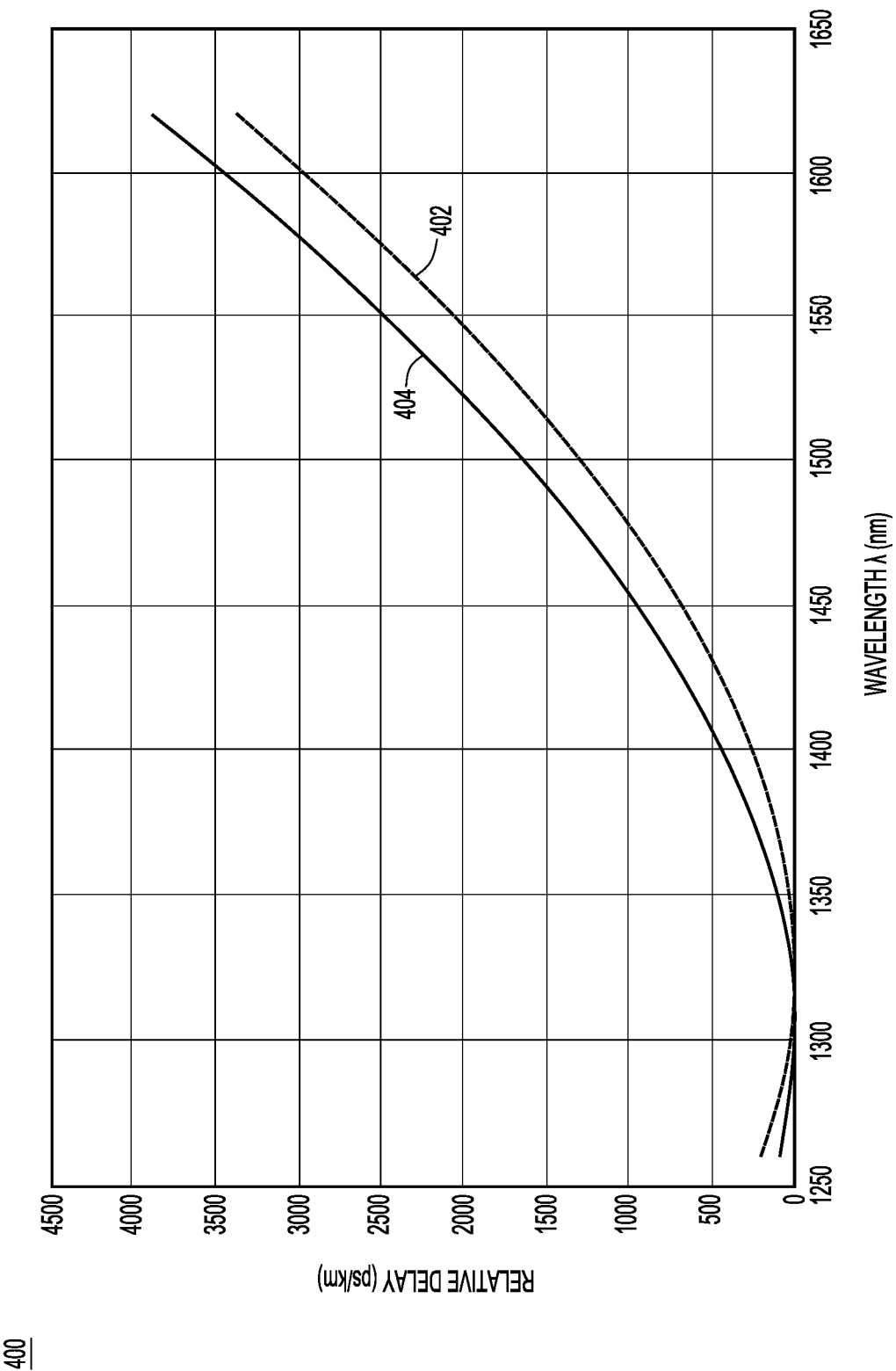
FIG. 4 illustrates plots of relative propagation delay versus wavelength of optical signals transmitted through an optical fiber, which plot is used in the methods presented herein, according to an example embodiment.

Reference is now made to FIG. 4. FIG. 4 shows plots 400 of relative propagation delay versus wavelength of optical signals transmitted through an optical fiber at different wavelengths, which is used according to an example embodiment. The relative delay is psec/km and wavelengths are in nm. For example, changing wavelength from 1528.77 nm to 1567.95 nm, provides a relative delay of the light propagation through the FP optical fiber 102 as 709.3488 psec per Km (assuming a slope of 0.093 (psec/(nm$^2$*2 km)) and lambda_zero of 1300 nm), as can be observed from FIG. 4. As such, 100 Km of the FP optical fiber 102 would exhibit a relative delay of around 70 nsec (700 psec).

Assuming zero delay at one specific wavelength (lambda), the delta (relative) delay of wavelength x is shown in FIG. 4. Optical fibers have different zero delays and if this parameter is unknown, the resulting relative delay will include a small error, resulting in a small error in the measurement of the length of the optical fiber. For example, for the wavelengths at 1530 nm and 1590 nm, the relative delay is approximately 1ns per km (2,500–1,500 psec/km). Curve 402 is for 1.046 ns and curve 404 is for 1.126 ns. The uncertainty of the actual relative delay of an optical fiber depends on the characteristic of physical medium. A maximum allowed range is between the two curves 402 and 404, but a maximum delta is approximately ±4%.

Returning back to FIG. 2, at 226, the slave node obtains a time variation (Time-Variation) that is a difference between (Delta") obtained at operation 220 and (Delta') obtained at operation 208.

At 228, the span length of the FP optical fiber 102 is obtained by dividing the time variation computed at 226 (Time_Variation) by the relative delta obtained at 224 (Relative_Delta). In other words, a wavelength differential delay is obtained to estimate the actual length of the FP optical fiber 102.

Figure 5:
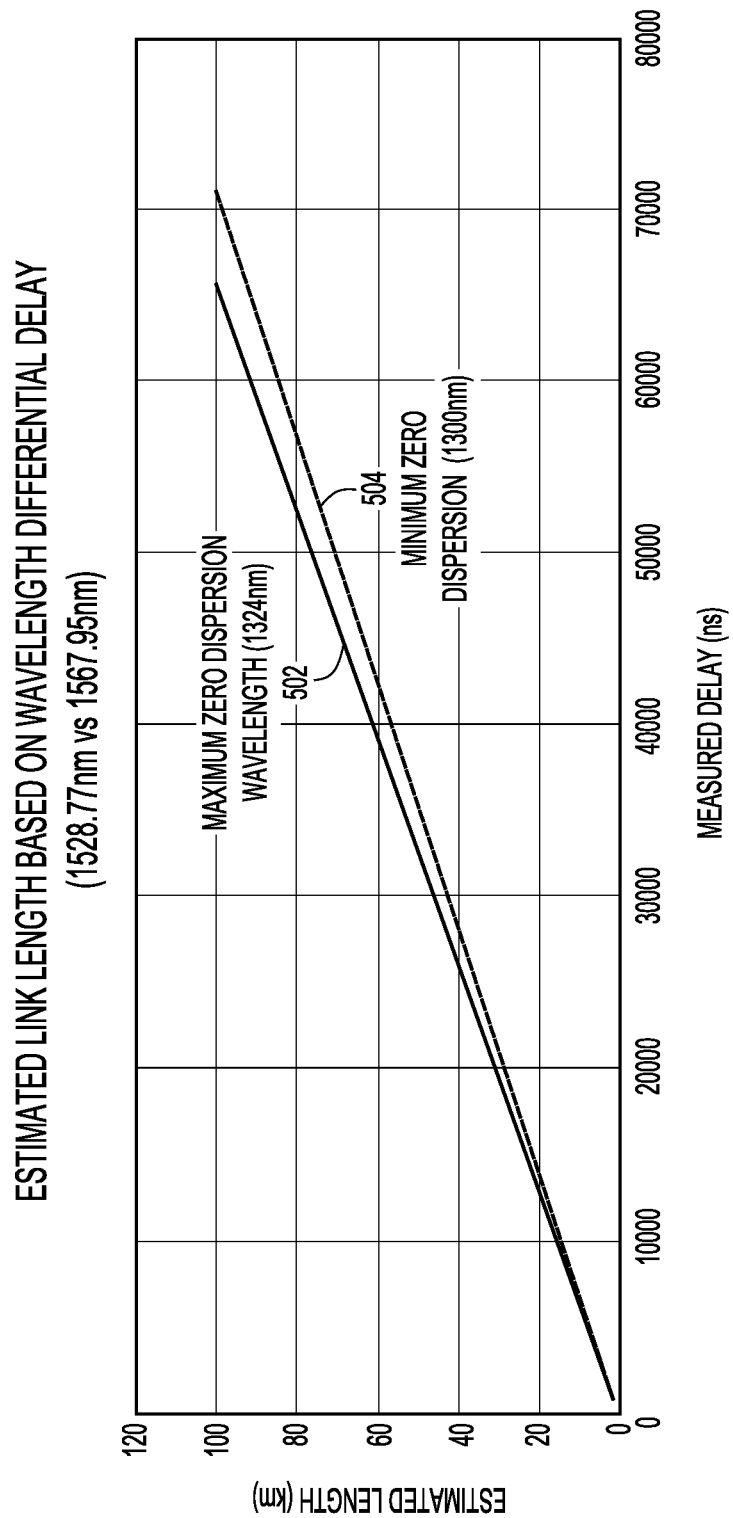
FIG. 5 illustrates plots of estimated length of an optical fiber versus propagation delay of the optical signals transmitted through an optical fiber at different wavelengths, according to an example embodiment.

Reference is now made to FIG. 5. FIG. 5 illustrates plots 500 of estimated length of an optical fiber versus propagation delay of optical signals transmitted through an optical fiber at different wavelengths, according to an example embodiment. In FIG. 5, two optical fibers having different physical characteristics are shown. Plot 502 is for an optical fiber with a maximum zero dispersion wavelength at 1324 nm and plot 504 is for another optical fiber with a minimum zero dispersion wavelength at 1300 nm.

In FIG. 5, a wavelength differential delay is obtained based on measurements performed at a wavelength 1528.77 nm and a wavelength 1567.96 nm. That is, the first sync message (at 302 of FIG. 3) is transmitted at the wavelength 1528.77 nm and the second sync message (at 308 of FIG. 3) is transmitted at the wavelength 1567.96 nm. Since the wavelength differential delay is proportional to the distance, if the wavelength differential delay (time variation/relative delta, at 228) is 40,000 picoseconds, the optical fiber is determined to be approximately 60 km. Knowledge of optical fiber's physical parameters, such as zero dispersion characteristic, leads to a more accurate path length calculation. If the optical fiber has unknown physical parameters then an estimated measure is affected by a small error. However, the error in the length computation is based on the distance between the two plots 502 and 504, that is, +/−4%.

According to an example embodiment, the length of an optical fiber may be calculated as follows. The input parameters may include:

The first selected wavelength=1528 nm and the second selected wavelength=1567.95;

Fiber characteristics that include: a slope (psec/nm$^2$ km)=0.093 and the wavelength zero dispersion=1312 nm; and The relative fiber delay (psec/km)=1886.162731 for the first selected wavelength And=2569.263849 for the second selected wavelength. The relative fiber delay is obtained by using the equation ((slope/8)*λ'$^\wedge$ 2*(1+(lambda_zero$^\wedge$ 4/$^\wedge$4)))−(slope/4)*lambda_zero $^\wedge$ 2, explained above.

Additionally, based on employing the PTP protocol as explained above with reference to FIG. 3, the following measurements are obtained:

The first timestamp T1'=0 psec

The second timestamp T2'=1000 psec

The third timestamp T1"=100,000 psec

The fourth timestamp T2"=135,150 psec

Based on the method 200 shown in FIG. 2, at 208, Delta'=T2'−T1'=1,000 psec, and at 220, Delta"=T2"−T1"=35,150 psec. The time variation, computed at 226, is 34,150 psec. Relative_delta, computed at 224, is 2569.263849−1886.162731 or 683.1011181. At 228, the length of an optical fiber is determined to be equal to 34,150/683.1011181 or 49.9925986 km (approximately 50 km).

According to one example embodiment, based on the estimated length of the optical fiber, an accurate propagation delay may be factored into clock synchronization. The TOD of the slave clock 122 of the slave node 120 is set to the time of the master clock 112 adjusted by an offset. For example, if 1 km of fiber introduces a 5 μs of delay. Based on determining that the fiber is 60 km, the delay or offset amount is determined to be 300 μs. Accordingly, the TOD of the master clock 112 (Tm), received by the slave node 120 is to be adjusted by 300 μs (Ts=Tm+300 μs).

Referring back to FIG. 3, the the master clock and the slave clock may be synchronized using the PTP packet exchange. The master clock 112 is set to time Tm and the slave clock 122 is to be synchronized with the master clock 112 (Ts=Tm plus an offset value). The determined length of the FP optical fiber 102 is used to determine the offset value or the propagation delay. The time value Tm is offset by the propagation delay of the optical signal on the FP optical fiber 102 to set the time Ts of the slave node 120.

According to yet another example embodiment, the length of the FP optical fiber 102 and the length of the RP optical fiber 104 are obtained and plugged into the PTP protocol by proportionally adjusting the offset based on the asymmetry of the FP optical fiber 102 and the RP optical fiber 104.

Still referring to FIG. 3, using the PTP technique, it is possible to calculate the round trip delay [(T2'-T1')+(T4'-T3')]. The round trip delay should be adjusted for the time it took the slave node 120 to receive the synchronization message and send back the acknowledgement message. The adjusted value is T3'-T2' or [(T2'-T1')-(T4'-T3')]. In the PTP technique, it is assumed that the FP optical fiber 102 has the same length as the RP optical fiber 104; therefore, the offset is the round trip delay divided by two (the same propagation delay in both the FP optical fiber 102 and the RP optical fiber 104 is assumed). The slave clock 122 is then set to time Ts=Tm+offset, where the offset is equal to [T4'-T1'-(T3'-T2')]/2. If the optical fibers are asymmetrical, an error is introduced. For example, if the FP optical fiber 102 is 95 km long and the RP optical fiber 104 is 105 km long, the offset error of the PTP technique is 25 μsec (or 5 μsec for each km). In fact, PTP calculates 100 km as a FP optical fiber 102 while the FP optical fiber 102 is 95 km, thus introducing an error of 5 km or 25 μsec. In an example embodiment, the offset is adjusted to be based on the asymmetry of the FP optical fiber 102 and the RP optical fiber 104.

In various example embodiments, to calculate the length of the FP optical fiber 102, the round trip delay is calculated at different wavelengths, adjusted by the first optical transmitter 114 of the master node 110. To calculate the length of the RP optical fiber 104, the round trip delay is calculated at different wavelengths, adjusted by the second optical transmitter 124. Timestamps T1', T2', T1", and T2" may be used to obtain the length of the FP optical fiber 102 when the first and second sync messages are transmitted, on different wavelengths, on the FP optical fiber 102. Timestamps T3', T4', T3", and T4" may be used to obtain the length of the RP optical fiber 104 when the first and second acknowledgement messages are transmitted, on different wavelengths, on the RP optical fiber 104.

As explained above, latency introduced by an optical fiber is not a fixed value. Latency changes depending on the wavelength used. DWDM systems use multiple wavelengths over the same fiber and the round trip delay is measured at different wavelengths. The skew between the measurements is correlated to different propagation times of the light over the fiber medium and provides a way to indirectly measure the length of the optical fiber. No additional hardware components are used nor any special devices for obtaining the measurements. In various example embodiments the PTP protocol (IEEE 1588v2) of an optical node is reused to calculate the round trip delay at different wavelengths, during an initialization phase, for example.

Figure 6:
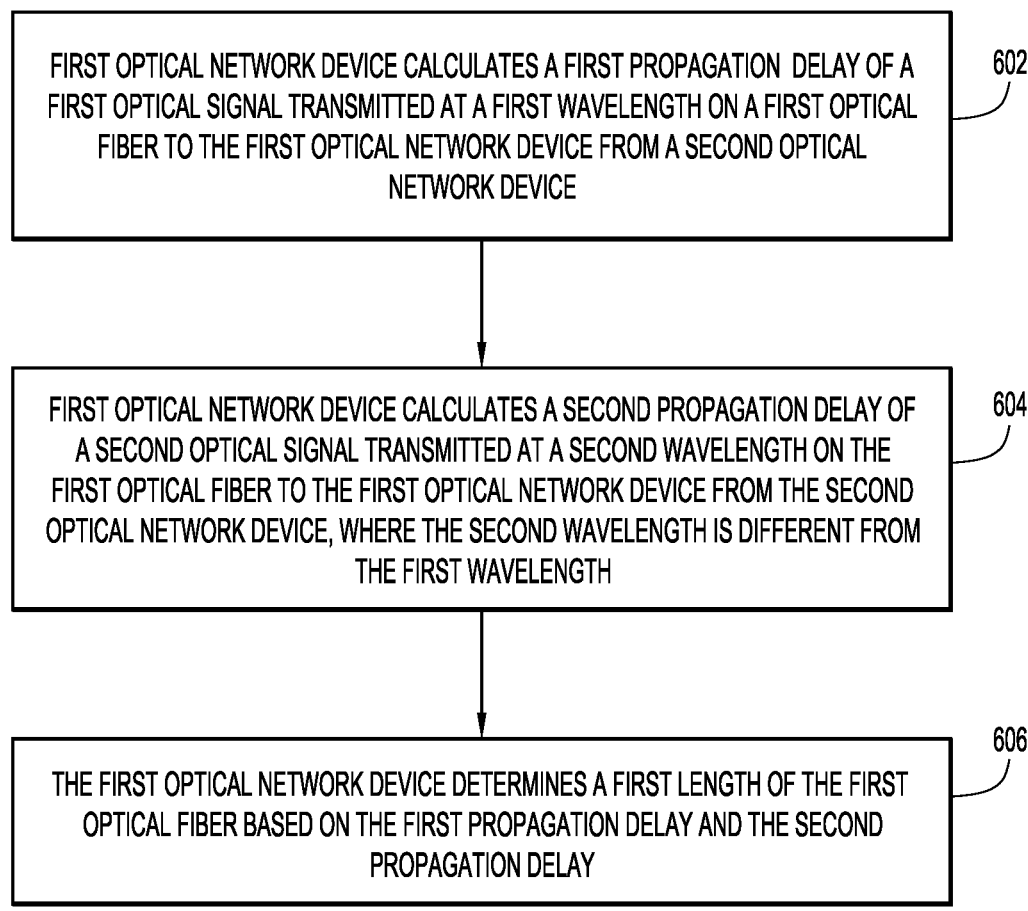
FIG. 6 is a flowchart generally depicting a method of determining length of an optical fiber in an optical network, according to an example embodiment.

FIG. 6 is a flowchart of a method 600 of determining a length of an optical fiber in an optical network, according to an example embodiment. The method 600 is performed by a first optical network device e.g., the master node 110 or the slave node 120 shown in FIG. 1.

At 602, the first optical network device calculates a first propagation delay of a first optical signal transmitted at a first wavelength on a first optical fiber to the first optical network device from a second optical network device.

At 604, the first optical network device calculates a second propagation delay of a second optical signal transmitted at a second wavelength on the first optical fiber to the first optical network device from the second optical network device, where the second wavelength is different from the first wavelength.

At 606, the first optical network device determines a first length of the first optical fiber based on the first propagation delay and the second propagation delay.

The method 600 may further include calculating, by the first optical network device, a third propagation delay of a third optical signal transmitted at the first wavelength on a second optical fiber to the second optical network device from the first optical network device and calculating, by the first optical network device, a fourth propagation delay of a fourth optical signal transmitted at the second wavelength on the second optical fiber to the second optical network device from the first optical network device. The method 600 may further include determining, by the first optical network device, a second length of the second optical fiber based on the third propagation delay and the fourth propagation delay.

The method 600 may further include determining, by the first optical network device, a measure of asymmetry between the first length of the first optical fiber and the second length of the second optical fiber and converting, by the first optical network device, the measure of asymmetry into a time offset value. The method 600 may further include adjusting, by the first optical network device, a time reference of the first optical network device based on the time offset value.

In one form, the method 600 may further include determining, by the first optical network device, a measure of asymmetry between the first length of the first optical fiber and the second length of the second optical fiber and adjusting, by the first optical network device, a time reference of the first optical network device based on the measure of asymmetry.

In the method 600, the operation of adjusting the time reference may include adjusting an offset value based on the measure of asymmetry when computing a round trip delay based on a timing protocol between the first optical fiber and the second optical fiber.

The method 600 may further include adjusting, by the first optical network device, a time reference of the first optical network device based on the first length of the first optical fiber.

According to one or more example embodiments, the second wavelength is greater than the first wavelength.

The determining operation 606 may include computing a difference between the first propagation delay and the second propagation delay. The method 600 may further include calculating, by the first optical network device, a first relative delay of the first optical fiber at the first wavelength based on at least one physical characteristic of the first optical fiber and calculating, by the first optical network device, a second relative delay of the first optical fiber at the second wavelength based on the at least one physical characteristic.

As described above, the at least one physical characteristic may include a zero dispersion wavelength And a zero dispersion slope.

The determining operation 606 may include calculating a relative delay difference between the second relative delay and the first relative delay and computing the first length of the first optical fiber based a time difference between the first propagation delay and the second propagation delay and the relative delay difference.

According to one or more example embodiments, the method 600 may further include receiving, by the first optical network device, the first optical signal that includes a first synchronization message of a precision time protocol, transmitted to the first optical network device at the first wavelength on the first optical fiber. The first synchronization message includes a first timestamp indicating a first transmission time for the first synchronization message. The method 600 further includes generating, by the first optical network device, a second timestamp indicating a first arrival time of the first synchronization message at the first optical network device and receiving, by the first optical network device, the second optical signal that includes a second synchronization message of the precision time protocol, transmitted to the first optical network device at the second wavelength on the first optical fiber. The second synchronization message includes a third timestamp indicating a second transmission time for the second synchronization message. The method 600 further includes generating, by the first optical network device, a fourth timestamp indicating a second arrival time of the second synchronization message at the first optical network device.

The calculating operation 602 may further include calculating a first difference between the first timestamp and the second timestamp and the calculating operation 604 may further include calculating a second difference between the third timestamp and the fourth timestamp.

Figure 7:
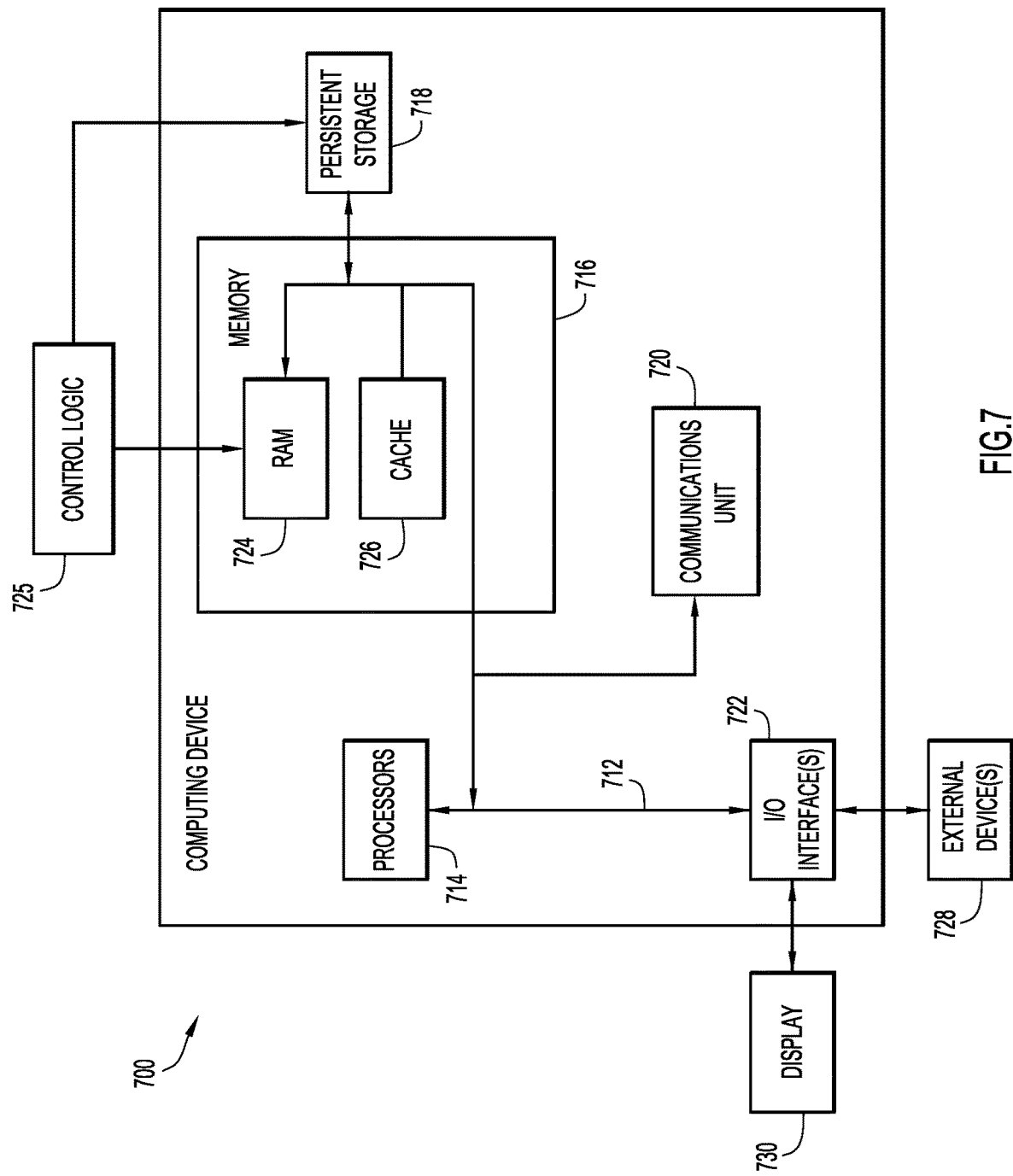
FIG. 7 is a hardware block diagram of a device configured to perform the techniques of determining length of an optical fiber to synchronize clocks of optical nodes in an optical network, according to various example embodiments.

FIG. 7 is a hardware block diagram illustrating a computing device 700 that may perform the functions of an optical network device referred to herein in connection with FIGS. 1-6, according to example embodiments. The computing device 700 performs the functions of the master node 110 or of the slave node 120 of FIG. 1.

It should be appreciated that FIG. 7 provides only an illustration of one embodiment and does not imply any limitations with regard to the environments in which different embodiments may be implemented. Many modifications to the depicted environment may be made.

As depicted, the computing device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the control logic 725 may be stored in memory 716 or persistent storage 718 for execution by processor(s) 714.

The control logic 725 includes instructions that, when executed by the computer processor(s) 714, cause the computing device 700 to perform one or more of the methods described herein including a method of determining a length of an optical fiber based on propagation delays obtained at different wavelengths. The control logic 725 may be stored in the memory 716 or the persistent storage 718 for execution by the computer processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computing device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

In still another example embodiment, an apparatus is an optical network device. The apparatus includes a communication interface, a memory configured to store executable instructions, and a processor coupled to the communication interface and the memory. The processor is configured to perform operations that include calculating a first propagation delay of a first optical signal transmitted at a first wavelength on a first optical fiber to the apparatus from a second optical network device, calculating a second propagation delay of a second optical signal transmitted at a second wavelength on the first optical fiber to the apparatus from the second optical network device. The second wavelength being different from the first wavelength. The processor is further configured to perform the operations that include determining a first length of the first optical fiber based on the first propagation delay and the second propagation delay.

The processor may further be configured to perform the operations including calculating a third propagation delay of a third optical signal transmitted at the first wavelength on a second optical fiber to the second optical network device from the apparatus and calculating a fourth propagation delay of a fourth optical signal transmitted at the second wavelength on the second optical fiber to the second optical network device from the apparatus. The processor may further be configured to perform the operations including determining a second length of the second optical fiber based on the third propagation delay and the fourth propagation delay.

The processor may further be configured to perform the operations including determining a measure of asymmetry between the first length of the first optical fiber and the second length of the second optical fiber, converting the measure of asymmetry into a time offset value, and adjusting a time reference of the apparatus based on the time offset value.

In one form, the processor may further be configured to perform the operations including determining a measure of asymmetry between the first length of the first optical fiber and the second length of the second optical fiber and adjusting a time reference of the apparatus based on the measure of asymmetry.

The processor may further be configured to perform the operation of adjusting the time reference by adjusting an offset value based on the measure of asymmetry when computing a round trip delay based on a timing protocol between the first optical fiber and the second optical fiber.

In yet another example embodiment, one or more non-transitory computer readable storage media encoded with instructions are provided. When the media is executed by the processor, the instructions cause the processor to perform operations including calculating a first propagation delay of a first optical signal transmitted at a first wavelength on a first optical fiber to a first optical network device from a second optical network device and calculating a second propagation delay of a second optical signal transmitted at a second wavelength on the first optical fiber to the first optical network device from the second optical network device. The second wavelength being different from the first wavelength. The operations further include determining a first length of the first optical fiber based on the first propagation delay and the second propagation delay.

The instructions may further cause the processor to perform additional operations of calculating a third propagation delay of a third optical signal transmitted at the first wavelength on a second optical fiber to the second optical network device from the first optical network device, calculating a fourth propagation delay of a fourth optical signal transmitted at the second wavelength on the second optical fiber to the second optical network device from the first optical network device, and determining a second length of the second optical fiber based on the third propagation delay and the fourth propagation delay.

In one form, the instructions may further cause the processor to perform additional operations of determining a measure of asymmetry between the first length of the first optical fiber and the second length of the second optical fiber, converting the measure of asymmetry into a time offset value, and adjusting a time reference of the first optical network device based on the time offset value.

The instructions may further cause the processor to perform additional operations of determining a measure of asymmetry between the first length of the first optical fiber and the second length of the second optical fiber and adjusting a time reference of the first optical network device based on the measure of asymmetry.

The embodiments presented may be in other various other forms, such as a system or a computer program product. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   calculating, by a first optical network device, a first propagation delay of a first optical signal transmitted at a first wavelength on a first optical fiber to the first optical network device from a second optical network device;
   calculating, by the first optical network device, a second propagation delay of a second optical signal transmitted at a second wavelength on the first optical fiber to the first optical network device from the second optical network device, the second wavelength being different from the first wavelength; and
   determining, by the first optical network device, a first length of the first optical fiber based on the first propagation delay and the second propagation delay.

2. The method of claim 1, further comprising:
   calculating, by the first optical network device, a third propagation delay of a third optical signal transmitted at the first wavelength on a second optical fiber to the second optical network device from the first optical network device;
   calculating, by the first optical network device, a fourth propagation delay of a fourth optical signal transmitted at the second wavelength on the second optical fiber to the second optical network device from the first optical network device; and
   determining, by the first optical network device, a second length of the second optical fiber based on the third propagation delay and the fourth propagation delay.

3. The method of claim 2, further comprising:
   determining, by the first optical network device, a measure of asymmetry between the first length of the first optical fiber and the second length of the second optical fiber;
   converting, by the first optical network device, the measure of asymmetry into a time offset value; and
   adjusting, by the first optical network device, a time reference of the first optical network device based on the time offset value.

4. The method of claim 2, further comprising:
   determining, by the first optical network device, a measure of asymmetry between the first length of the first optical fiber and the second length of the second optical fiber; and
   adjusting, by the first optical network device, a time reference of the first optical network device based on the measure of asymmetry.

5. The method of claim 4, wherein adjusting the time reference includes:
   adjusting an offset value based on the measure of asymmetry when computing a round trip delay based on a timing protocol between the first optical fiber and the second optical fiber.

6. The method of claim 1, further comprising:
   adjusting, by the first optical network device, a time reference of the first optical network device based on the first length of the first optical fiber.

7. The method of claim 1, wherein the second wavelength is greater than the first wavelength.

8. The method of claim 1, wherein determining the first length includes computing a difference between the first propagation delay and the second propagation delay, and the method further comprising:
   calculating, by the first optical network device, a first relative delay of the first optical fiber at the first wavelength based on at least one physical characteristic of the first optical fiber; and
   calculating, by the first optical network device, a second relative delay of the first optical fiber at the second wavelength based on the at least one physical characteristic.

9. The method of claim 8, wherein the at least one physical characteristic includes a zero dispersion wavelength And a zero dispersion slope.

10. The method of claim 8, wherein determining the first length of the first optical fiber includes:
    calculating a relative delay difference between the second relative delay and the first relative delay; and
    computing the first length of the first optical fiber based a time difference between the first propagation delay and the second propagation delay and the relative delay difference.

11. The method of claim 1, further comprising:
    receiving, by the first optical network device, the first optical signal that includes a first synchronization message of a precision time protocol, transmitted to the first optical network device at the first wavelength on the first optical fiber, the first synchronization message including a first timestamp indicating a first transmission time for the first synchronization message;

generating, by the first optical network device, a second timestamp indicating a first arrival time of the first synchronization message at the first optical network device;

receiving, by the first optical network device, the second optical signal that includes a second synchronization message of the precision time protocol, transmitted to the first optical network device at the second wavelength on the first optical fiber, the second synchronization message including a third timestamp indicating a second transmission time for the second synchronization message; and generating, by the first optical network device, a fourth timestamp indicating a second arrival time of the second synchronization message at the first optical network device, wherein calculating the first propagation delay includes calculating a first difference between the first timestamp and the second timestamp and calculating the second propagation delay includes calculating a second difference between the third timestamp and the fourth timestamp.

12. An apparatus comprising:
a communication interface;
a memory configured to store executable instructions; and
a processor coupled to the communication interface and the memory and configured to perform operations including:
  calculating a first propagation delay of a first optical signal transmitted at a first wavelength on a first optical fiber to the apparatus from a second optical network device;
  calculating a second propagation delay of a second optical signal transmitted at a second wavelength on the first optical fiber to the apparatus from the second optical network device, the second wavelength being different from the first wavelength; and
  determining a first length of the first optical fiber based on the first propagation delay and the second propagation delay.

13. The apparatus of claim 12, wherein the processor is further configured to perform the operations including:
  calculating a third propagation delay of a third optical signal transmitted at the first wavelength on a second optical fiber to the second optical network device from the apparatus;
  calculating a fourth propagation delay of a fourth optical signal transmitted at the second wavelength on the second optical fiber to the second optical network device from the apparatus; and
  determining a second length of the second optical fiber based on the third propagation delay and the fourth propagation delay.

14. The apparatus of claim 13, wherein the processor is further configured to perform the operations including:
  determining a measure of asymmetry between the first length of the first optical fiber and the second length of the second optical fiber;
  converting the measure of asymmetry into a time offset value; and
  adjusting a time reference of the apparatus based on the time offset value.

15. The apparatus of claim 13, wherein the processor is further configured to perform the operations including:
  determining a measure of asymmetry between the first length of the first optical fiber and the second length of the second optical fiber; and
  adjusting a time reference of the apparatus based on the measure of asymmetry.

16. The apparatus of claim 15, wherein the processor is configured to perform the operation of adjusting the time reference by adjusting an offset value based on the measure of asymmetry when computing a round trip delay based on a timing protocol between the first optical fiber and the second optical fiber.

17. One or more non-transitory computer readable storage media encoded with instructions that, when executed by a processor, cause the processor to perform operations including:
  calculating a first propagation delay of a first optical signal transmitted at a first wavelength on a first optical fiber to a first optical network device from a second optical network device;
  calculating a second propagation delay of a second optical signal transmitted at a second wavelength on the first optical fiber to the first optical network device from the second optical network device, the second wavelength being different from the first wavelength; and
  determining a first length of the first optical fiber based on the first propagation delay and the second propagation delay.

18. The one or more non-transitory computer readable storage media according to claim 17, wherein the instructions further cause the processor to perform additional operations including:
  calculating a third propagation delay of a third optical signal transmitted at the first wavelength on a second optical fiber to the second optical network device from the first optical network device;
  calculating a fourth propagation delay of a fourth optical signal transmitted at the second wavelength on the second optical fiber to the second optical network device from the first optical network device; and
  determining a second length of the second optical fiber based on the third propagation delay and the fourth propagation delay.

19. The one or more non-transitory computer readable storage media according to claim 18, wherein the instructions further cause the processor to perform additional operations including:
  determining a measure of asymmetry between the first length of the first optical fiber and the second length of the second optical fiber;
  converting the measure of asymmetry into a time offset value; and
  adjusting a time reference of the first optical network device based on the time offset value.

20. The one or more non-transitory computer readable storage media according to claim 17, wherein the first propagation delay and the second propagation delay are calculated based on messages transmitted in a precision time protocol.

* * * * *